Patented Oct. 20, 1936

2,058,200

UNITED STATES PATENT OFFICE 2,058,200

INSECTICIDAL SOLUTION

Robert Wotherspoon, East Orange, N. J., assignor to Derris, Inc., New York, N. Y., a corporation of New York No Drawing. Application September 12, 1932,
Serial No. 632,790

13 Claims. (Cl. 167—24)

The insecticidal values of the various ingredients of the root of *Derris elliptica*, and other plants and roots, and especially of their constituent rotenone, have been extensively investigated and thoroughly determined, and they have become products of great commercial importance.

The known active insecticidal bases contained in the roots of *Derris elliptica*, *Derris maccadensis*, the plant *Robinia-nicou* or *Lonchocarpus nicou* (known locally as "cube") of haiari and other roots and plants are rotenone, deguelin, tephrosin and toxicarol, the rotenone having greater insecticidal properties than the others and being generally found in larger proportions than the other mentioned active bases.

The generally adopted method for the production of a commercial insecticide of the described character is to treat the root, or plant, with solvents such as benzole, acetone, acetone-alcohol mixture, petroleum distillate, chloroform, ethylene, dichloride, ether, toluol, xylene, etc., these solutions being added to water if necessary with the addition of an emulsifying agent for purposes of practical application as a spray, or otherwise.

The above mentioned solutions have many disadvantages, which have interfered with the extension of use of these products which their insecticide properties warrant, among which are the disagreeable odors of the solvents, their toxic properties, the non-insecticidal properties of the solvents thus causing a dilution of the insecticidal strength of the solution, the low flash point of the solvent causing fire danger, the comparatively small solvent power of the petroleum distillate solvents necessitating the employment of large quantities of the dissolving agent, and the fact that the insecticidal base precipitates from the solution upon standing, or at temperatures below normal, when the solution is of proper strength for good commercial usage.

In employing some of these solutions, they are added to water, the active ingredients being precipitated in an extremely fine condition and the mixture is sprayed on the insect infested plants or applied otherwise.

I have overcome the above mentioned, and other, objectionable features of the present employed solvents by employing previously unknown solvents for the insecticidal principles which have high boiling points, high flash points, have pleasant odors, allow of the production of concentrations of greater strength without precipitation and which are considered as having insecticidal properties.

I have found that alkylated phenolic ethers possess the valuable solvent properties to which reference has been made, among which are safrol, anethol, methyl eugenol and camphor oil. I do not limit myself to the particular compounds specifically mentioned, as these are given simply as examples of the compounds adaptable in my process.

I have found that the solvents of my invention have the further great advantage that when mixed with chemicals having little, or no, solvent action upon the insecticidal principles, the mixture will tolerate larger quantities of the principles than is possible with these poorer solvents alone, thus opening up a much wider field of usefulness for such insecticide.

Among the poorer solvents to which reference is made are oil of turpentine, pine oil, terpineol, dipentene, phellandrene, terpinolene, limonene, cedrene, and petroleum distillates.

The solvents of my invention are also good solvents for the pyrethrins contained in pyrethrum flowers and, hence, a combination of the insecticidal values of pyrethrin and those of the first mentioned products may be readily obtained and thus is of special value in certain applications, in that the rotenone is slow in action but of positive insecticide results, whereas, the pyrethrins paralyze quickly, but do not possess the positive toxic properties of rotenone, and my invention, therefore, includes my solvents in connection with these two general classes of insecticides, alone and in combination.

I can employ the solvents of my invention by treating the finely divided, or ground, plant material with one or more of the solvents, either hot or cold, or the plant material may be first extracted with one of the present known solvents, such as acetone, benzole, etc., or mixtures of these with alcohol, and after separation from the insoluble material, and the removal of above solvents adding one or more of my solvents to the residue.

It is customary to add soap or other emulsifying agents to solutions of insecticide, as dispersing, or spreading agent, especially when used as a spray, and a similar procedure may be employed with the solvents of my invention and I have found that particularly advantageous results are obtained when an anhydrous soap is employed, such as triethanolamine oleate, the addition of this product resulting in a valuable fine emulsion when diluted with the proper amount of water.

The following are examples of soap-containing solutions of insecticides in which some of the solvents of my invention are employed:

Example 1

50 parts of a solution of the active principles of derris root in safrol containing about 10% of the derris extractives and 90% safrol.
50 parts triethanolamine oleate.

Example 2

25 parts 5% solution of rotenone in camphor oil S. G., 970.
25 parts concentrated solution pyrethrum flowers in camphor oil S. G., 970.
50 parts triethanolamine oleate.

The new solvent extracts of derris or cube may also be used in conjunction with water provided a proper colloid is present to form a stable emulsion.

These colloids are soap, starch, gum acacia, gum ghatti, gum karaya, gum tragacanth, dextrin, glucose, sucrose, saponin or extracts of plants rich in the latter.

The following are examples of oil extract, water emulsions containing protective colloids. The oil extracts referred to above are solutions of derris or cube principles in some of the solvents of my invention:—

Example 3

25 parts of a solution of the active principles of derris root containing about 10% of the derris extractives and 90% safrol.
75 parts of aqueous solution of gum acacia containing 10% of the latter.

This mixture is passed through a homogenizer or colloid mill to disperse same.

Example 4

15 parts of a 5% solution of rotenone in camphor oil S. G., 970.
10 parts of a concentrated solution of pyrethrum flowers in camphor oil S. G., 970.
25 parts of a concentrated aqueous solution of cocoanut oil soap.
50 parts of an aqueous solution of gum ghatti containing 5% of the latter.

This mixture is passed through a homogenizer or colloid mill to disperse same.

The following are examples of the use of the solvents of my invention in mixture with other solvents:—

Example 5

5 parts of a 2% solution of rotenone in safrol are mixed with
95 parts by volume of petroleum distillate.

Example 6

10 parts of a 1% solution of rotenone in camphor oil are mixed with
90 parts by volume of petroleum distillate.

Example 7

2½ parts of pyrethrum extract (20 to 1) and
5 parts of a 2% solution of rotenone in safrol are mixed with
92½ parts by volume of petroleum distillate.

It will thus be seen that the solvents of my invention are new and useful and that through their employment, insecticidal solutions of greatly improved and highly valuable characters can be produced.

I do not limit myself to the particular chemicals, times, temperatures, amount of steps of procedure specifically mentioned, as these are given simply as a means for clearly describing the subject matters of my invention.

What I claim is:—

1. A composition of matter consisting of a non-aqueous solution of the insecticidal principles obtainable from one or more members of the group consisting of derris and pyrethrum in at least one member of the group of alkylated phenolic ethers consisting of safrol, anethol, methyl eugenol and camphor oil said solvents being in sufficient quantities to maintain the insecticidal principles in solution.

2. A composition of matter consisting of a non-aqueous solution of the insecticidal principles obtainable from one or more members of the group consisting of derris and pyrethrum in at least one member of the group of alkylated phenolic ethers consisting of safrol, anethol, methyl eugenol and camphor oil said solvents being in sufficient quantities to maintain the insecticidal principles in solution and an anhydrous soap.

3. A composition of matter consisting of a non-aqueous solution of the insecticidal principles obtainable from one or more members of the group consisting of derris and pyrethrum in at least one member of the group of alkylated phenolic ethers consisting of safrol, anethol, methyl eugenol and camphor oil said solvents being in sufficient quantities to maintain the insecticidal principles in solution and a petroleum hydrocarbon.

4. A composition of matter consisting of a non-aqueous solution of rotenone in at least one member of the group of alkylated phenolic ethers consisting of safrol, anethol, methyl eugenol and camphor oil said solvents being in sufficient quantities to maintain the insecticidal principles in solution.

5. A composition of matter consisting of a non-aqueous solution of the insecticidal principles of derris in at least one member of the group of alkylated phenolic ethers consisting of safrol, anethol, methyl eugenol and camphor oil said solvents being in sufficient quantities to maintain the insecticidal principles in solution.

6. A composition of matter consisting of a non-aqueous solution of the insecticidal principles of derris in at least one member of the group of alkylated phenolic ethers consisting of safrol, anethol, methyl eugenol and camphor oil said solvents being in sufficient quantities to maintain the insecticidal principles in solution and an anhydrous soap.

7. A composition of matter consisting of a non-aqueous solution of the insecticidal principles of derris in at least one member of the group of alkylated phenolic ethers consisting of safrol, anethol, methyl eugenol and camphor oil said solvents being in sufficient quantities to maintain the insecticidal principles in solution and a petroleum hydrocarbon.

8. A composition of matter consisting of a non-aqueous solution of rotenone in camphor oil said camphor oil being in sufficient quantity to maintain the rotenone in solution.

9. A composition of matter consisting of a non-aqueous solution of rotenone in camphor oil said camphor oil being in sufficient quantity to maintain the rotenone in solution and an anhydrous soap.

10. A composition of matter consisting of a non-aqueous solution of rotenone in camphor oil said camphor oil being in sufficient quantity to maintain the rotenone in solution and a petroleum hydrocarbon.

11. A composition of matter consisting of a non-aqueous solution of the insecticidal principles of derris in camphor oil said camphor oil being in sufficient quantity to maintain the insecticidal principles in solution.

12. A composition of matter consisting of a non-aqueous solution of the insecticidal principles of derris in camphor oil said camphor oil being in sufficient quantity to maintain the insecticidal principles in solution and an anhydrous soap.

13. A composition of matter consisting of a non-aqueous solution of the insecticidal principles of derris in camphor oil said camphor oil being in sufficient quantity to maintain the insecticidal principles in solution and a petroleum hydrocarbon.

ROBERT WOTHERSPOON.